(12) United States Patent
Talib (10) Patent No.: US 11,856,134 B2
(45) Date of Patent: *Dec. 26, 2023

(54) FRAUD DETECTION SYSTEM AND METHOD

(71) Applicant: Nuance Communications, Inc., Burlington, MA (US)

(72) Inventor: Haydar Talib, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,977

(22) Filed: May 10, 2022

(65) Prior Publication Data

US 2022/0294900 A1 Sep. 15, 2022

Related U.S. Application Data

(63) Continuation of application No. 17/078,652, filed on Oct. 23, 2020, now Pat. No. 11,363,138.

(51) Int. Cl.
*H04M 3/42* (2006.01)
*H04M 3/22* (2006.01)
*H04M 3/436* (2006.01)

(52) U.S. Cl.
CPC ..... *H04M 3/42221* (2013.01); *H04M 3/2281* (2013.01); *H04M 3/42042* (2013.01); *H04M 3/42059* (2013.01); *H04M 3/436* (2013.01); *H04M 2203/6027* (2013.01)

(58) Field of Classification Search
CPC .......... H04M 3/42221; H04M 3/2281; H04M 3/42042; H04M 3/42059; H04M 2203/6027

USPC ...... 379/88.02, 88.19, 88.26, 114.14, 144.01
See application file for complete search history.

(56) References Cited

U.S. PATENT DOCUMENTS

| 11,275,854 B2 * | 3/2022 | Talib ................... G10L 15/1807 |
| 11,363,138 B2 * | 6/2022 | Talib ................. H04M 3/42059 |
| 2006/0285665 A1 | 12/2006 | Wasserblat |
| 2006/0289622 A1 * | 12/2006 | Khor ...................... G10L 17/02 235/375 |
| 2010/0228656 A1 * | 9/2010 | Wasserblat ............. G06Q 10/10 705/35 |
| 2015/0195406 A1 | 7/2015 | Dwyer |
| 2015/0269946 A1 | 9/2015 | Jones |
| 2015/0310469 A1 | 10/2015 | Bemmel |
| 2018/0240028 A1 | 8/2018 | Baracaldo |
| 2018/0295238 A1 * | 10/2018 | Hardy ................. G10L 15/1822 |
| 2019/0141183 A1 | 5/2019 | Chandrasekaran |

(Continued)

OTHER PUBLICATIONS

International Search Report and Written Opinion issued in International Application No. PCT/US2021/056251 dated Dec. 1, 2021.

*Primary Examiner* — Binh Kien Tieu
(74) *Attorney, Agent, or Firm* — Brian J. Colandreo; Heath M. Sargeant; Holland & Knight LLP (57) ABSTRACT

A method, computer program product, and computing system for receiving input information concerning a conversation between a caller and a recipient; processing the input information to assess a fraud-threat-level; defining a targeted response based, at least in part, upon the fraud-threat-level assessed, wherein the targeted response is intended to refine the assessed fraud-threat-level; and effectuating the targeted response.

24 Claims, 4 Drawing Sheets

(56) References Cited

U.S. PATENT DOCUMENTS

| | | |
|---|---|---|
| 2019/0394333 A1* | 12/2019 | Jiron ................. G06F 21/32 |
| 2020/0067978 A1 | 2/2020 | Jakobsson |
| 2020/0162509 A1* | 5/2020 | Ballot ............... H04L 63/1425 |
| 2020/0193051 A1 | 6/2020 | Van Antwerp |
| 2020/0243077 A1* | 7/2020 | Rao ................... G10L 15/22 |
| 2020/0366671 A1 | 11/2020 | Larson |
| 2021/0136209 A1 | 5/2021 | Adibi |
| 2021/0289071 A1 | 9/2021 | Way |

* cited by examiner

FRAUD DETECTION SYSTEM AND METHOD

RELATED APPLICATION(S)

This application is a continuation of U.S. patent application Ser. No. 17/078,652 filed Oct. 23, 2020, the entire contents of which is herein incorporated by reference.

TECHNICAL FIELD

This disclosure relates to conversation monitoring and, more particularly, to systems and methods that monitor conversations to detect fraudsters.

BACKGROUND

In many interactions between people (e.g., a customer calling a business and the customer service representative that handles the call), fraudsters often impersonate legitimate customers in an attempt to commit an act of fraud. For example, a fraudster my reach out to a credit card company and pretend to be a customer of the credit card company so that they may fraudulently obtain a copy to that customer's credit card. Unfortunately, these fraudsters are often successful, resulting in fraudulent charges, fraudulent monetary transfers, and identity theft. For obvious reasons, it is desirable to identify these fraudsters and prevent them from being successful.

SUMMARY OF DISCLOSURE

In one implementation, a computer-implemented method is executed on a computing device and includes: receiving input information concerning a conversation between a caller and a recipient; processing the input information to assess a fraud-threat-level; defining a targeted response based, at least in part, upon the fraud-threat-level assessed, wherein the targeted response is intended to refine the assessed fraud-threat-level; and effectuating the targeted response.

One or more of the following features may be included. The input information may include one or more of: a caller conversation portion; a recipient conversation portion; and biometric information concerning the caller. The conversation may include one or more of: a voice-based conversation between the caller and the recipient; and a text-based conversation between the caller and the recipient. Effectuating the targeted response may include one or more of: allowing the conversation to continue; asking a question of the caller; prompting the recipient to ask a question of the caller; effecting a transfer from the recipient to a third-party; and ending the conversation between the caller and the recipient. Processing the input information to determine a fraud-threat-level may include: determining if the input information is indicative of fraudulent behavior. Determining if the input information is indicative of fraudulent behavior may include: comparing the input information to a plurality of fraudulent behaviors. The plurality of fraudulent behaviors may include a plurality of empirically-defined fraudulent behaviors. The plurality of empirically-defined fraudulent behaviors may be defined via AI/ML processing of information concerning a plurality of earlier conversations.

In another implementation, a computer program product resides on a computer readable medium and has a plurality of instructions stored on it. When executed by a processor, the instructions cause the processor to perform operations including receiving input information concerning a conversation between a caller and a recipient; processing the input information to assess a fraud-threat-level; defining a targeted response based, at least in part, upon the fraud-threat-level assessed, wherein the targeted response is intended to refine the assessed fraud-threat-level; and effectuating the targeted response.

One or more of the following features may be included. The input information may include one or more of: a caller conversation portion; a recipient conversation portion; and biometric information concerning the caller. The conversation may include one or more of: a voice-based conversation between the caller and the recipient; and a text-based conversation between the caller and the recipient. Effectuating the targeted response may include one or more of: allowing the conversation to continue; asking a question of the caller; prompting the recipient to ask a question of the caller; effecting a transfer from the recipient to a third-party; and ending the conversation between the caller and the recipient. Processing the input information to determine a fraud-threat-level may include: determining if the input information is indicative of fraudulent behavior. Determining if the input information is indicative of fraudulent behavior may include: comparing the input information to a plurality of fraudulent behaviors. The plurality of fraudulent behaviors may include a plurality of empirically-defined fraudulent behaviors. The plurality of empirically-defined fraudulent behaviors may be defined via AI/ML processing of information concerning a plurality of earlier conversations.

In another implementation, a computing system includes a processor and memory is configured to perform operations including receiving input information concerning a conversation between a caller and a recipient; processing the input information to assess a fraud-threat-level; defining a targeted response based, at least in part, upon the fraud-threat-level assessed, wherein the targeted response is intended to refine the assessed fraud-threat-level; and effectuating the targeted response.

One or more of the following features may be included. The input information may include one or more of: a caller conversation portion; a recipient conversation portion; and biometric information concerning the caller. The conversation may include one or more of: a voice-based conversation between the caller and the recipient; and a text-based conversation between the caller and the recipient. Effectuating the targeted response may include one or more of: allowing the conversation to continue; asking a question of the caller; prompting the recipient to ask a question of the caller; effecting a transfer from the recipient to a third-party; and ending the conversation between the caller and the recipient. Processing the input information to determine a fraud-threat-level may include: determining if the input information is indicative of fraudulent behavior. Determining if the input information is indicative of fraudulent behavior may include: comparing the input information to a plurality of fraudulent behaviors. The plurality of fraudulent behaviors may include a plurality of empirically-defined fraudulent behaviors. The plurality of empirically-defined fraudulent behaviors may be defined via AI/ML processing of information concerning a plurality of earlier conversations.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
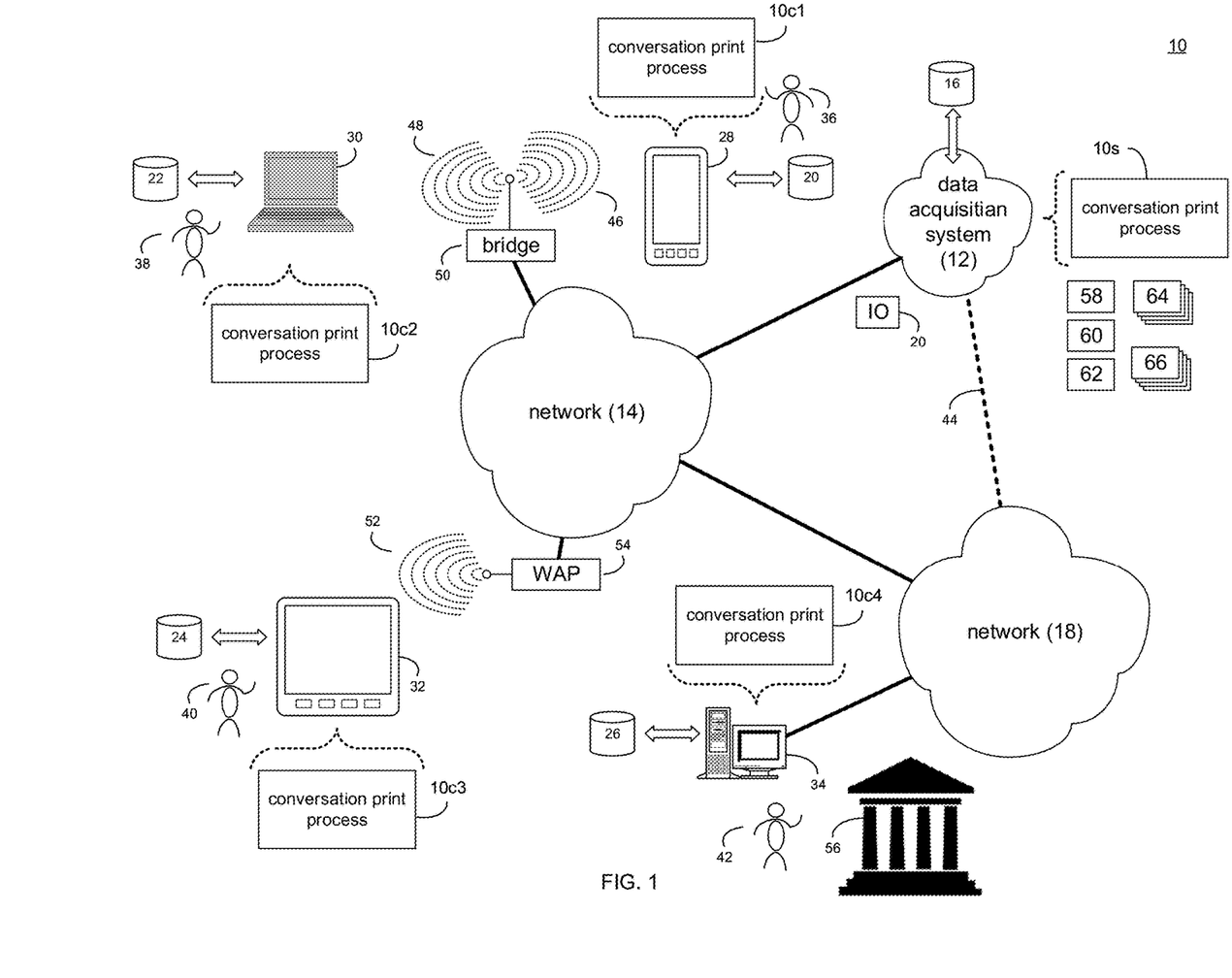
FIG. 1 is a diagrammatic view of a data acquisition system and a fraud detection process coupled to a distributed computing network.

System Overview:

Referring to FIG. 1, there is shown fraud detection process 10. As will be discussed below in greater detail, fraud detection process 10 may be configured to interface with data acquisition system 12 and detect and/or frustrate fraudsters.

Fraud detection process 10 may be implemented as a server-side process, a client-side process, or a hybrid server-side/client-side process. For example, fraud detection process 10 may be implemented as a purely server-side process via fraud detection process 10s. Alternatively, fraud detection process 10 may be implemented as a purely client-side process via one or more of fraud detection process 10c1, fraud detection process 10c2, fraud detection process 10c3, and fraud detection process 10c4. Alternatively still, fraud detection process 10 may be implemented as a hybrid server-side/client-side process via fraud detection process 10s in combination with one or more of fraud detection process 10c1, fraud detection process 10c2, fraud detection process 10c3, and fraud detection process 10c4.

Accordingly, fraud detection process 10 as used in this disclosure may include any combination of fraud detection process 10s, fraud detection process 10c1, fraud detection process 10c2, fraud detection process 10c3, and fraud detection process 10c4.

Fraud detection process 10s may be a server application and may reside on and may be executed by data acquisition system 12, which may be connected to network 14 (e.g., the Internet or a local area network). Data acquisition system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, one or more software applications, one or more software platforms, a cloud-based computational system, and a cloud-based storage platform.

As is known in the art, a SAN may include one or more of a personal computer, a server computer, a series of server computers, a mini computer, a mainframe computer, a RAID device and a NAS system. The various components of data acquisition system 12 may execute one or more operating systems, examples of which may include but are not limited to: Microsoft Windows Server™; Redhat Linux™, Unix, or a custom operating system, for example.

The instruction sets and subroutines of fraud detection process 10s, which may be stored on storage device 16 coupled to data acquisition system 12, may be executed by one or more processors (not shown) and one or more memory architectures (not shown) included within data acquisition system 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from fraud detection process 10s, fraud detection process 10c1, fraud detection process 10c2, fraud detection process 10c3 and/or fraud detection process 10c4 to data acquisition system 12. Examples of IO request 20 may include but are not limited to data write requests (i.e. a request that content be written to data acquisition system 12) and data read requests (i.e. a request that content be read from data acquisition system 12).

The instruction sets and subroutines of fraud detection process 10c1, fraud detection process 10c2, fraud detection process 10c3 and/or fraud detection process 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 20, 22, 24, 26 may include but are not limited to: hard disk drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, tablet computer 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access fraud detection process 10 directly through network 14 or through secondary network 18. Further, fraud detection process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, tablet computer 32 is shown wirelessly coupled to network 14 via wireless communication channel 52 established between tablet computer 32 and wireless access point (i.e., WAP) 54, which is shown directly coupled to network 14. Additionally, personal computer 34 is shown directly coupled to network 18 via a hardwired network connection.

The Data Acquisition System:

As will be discussed below in greater detail, data acquisition system 12 may be configured to acquire data that is provided by a third-party (e.g., a caller) to a platform user (e.g., a recipient) during an engagement (e.g., a conversation).

Examples of such a conversation between a caller (e.g., user 36) and a recipient (e.g., user 42) may include but are not limited to one or more of: a voice-based conversation between the caller (e.g., user 36) and the recipient (e.g., user 42); and a text-based conversation between the caller (e.g., user 36) and the recipient (e.g., user 42). For example, a customer may call a sales phone line to purchase a product; a customer may call a reservation line to book air travel; and a customer may text chat with a customer service line to request assistance concerning a product purchased or a service received.

Assume for the following example that the caller (e.g., user 36) is a customer who contacts bank 56 to request assistance concerning one or more of their bank accounts and the recipient (e.g., user 42) is a customer service employee of bank 56.

Figure 2:
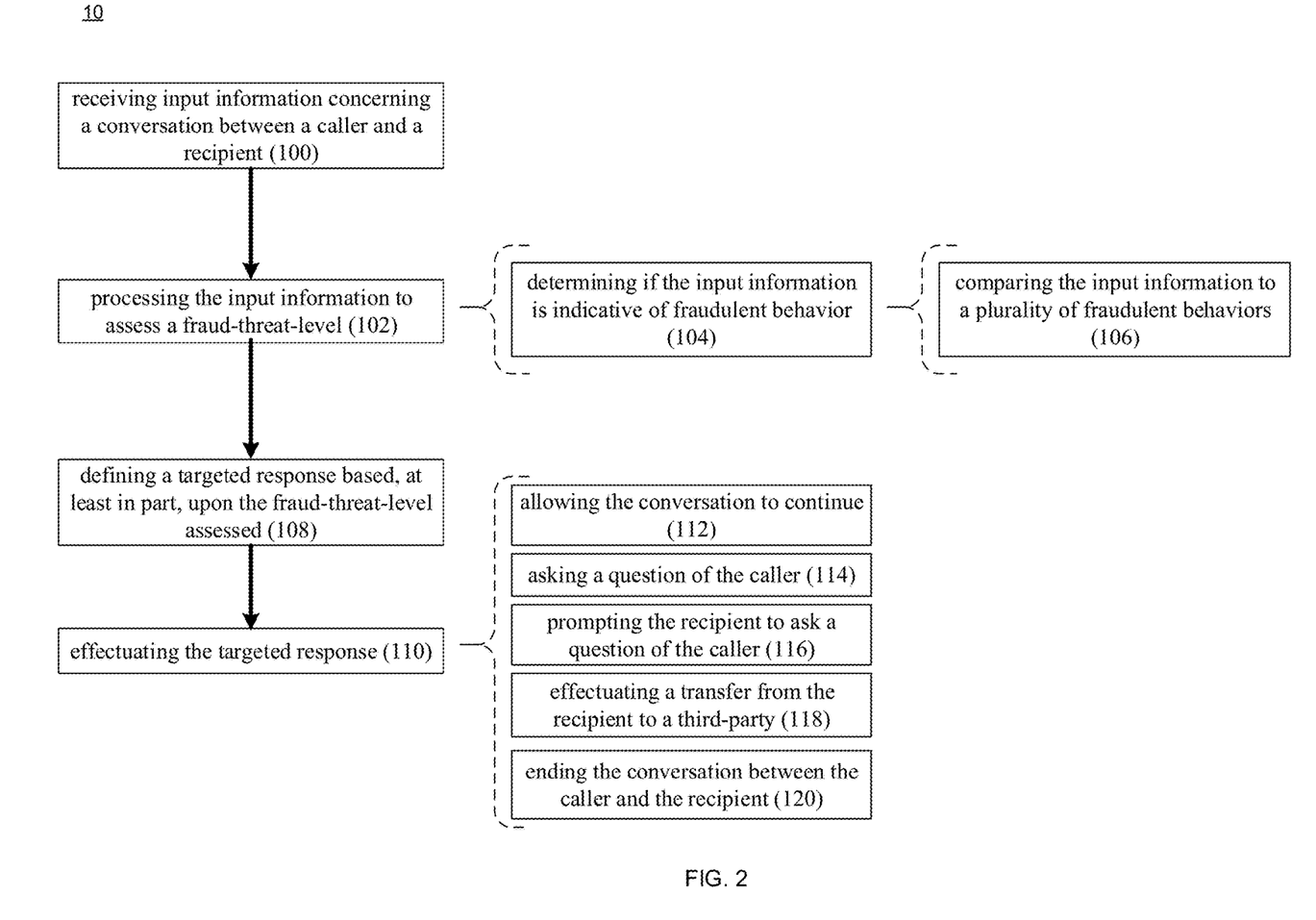
FIG. 2 is a flow chart of an implementation of the fraud detection process of FIG. 1.

Fraud Detection Process:

Referring also to FIG. 2, data acquisition system 12 may monitor the conversation between the caller (e.g., user 36) and the recipient (e.g., user 42) to determine whether or not the caller (e.g., user 36) is a fraudster. For the following discussion, a fraudster may be a human being (e.g., a person that commits acts of fraud), a computer-based system (e.g., a speech "bot" that follows a script and uses artificial intelligence to respond to questions by the customer service representative), and a hybrid system (e.g., a person that commits acts of fraud but uses a computer-based system to change their voice).

In the event that the monitored conversation is a voice-based conversation between the caller (e.g., user 36) and the recipient (e.g., user 42), fraud detection process 10 may process the voice-based conversation to define a conversation transcript for the voice-based conversation. For example, fraud detection process 10 may process the voice-based conversation to produce a conversation transcript using e.g., various speech-to-text platforms or applications (e.g., such as those available from Nuance Communications, Inc. of Burlington, MA).

Figure 3:
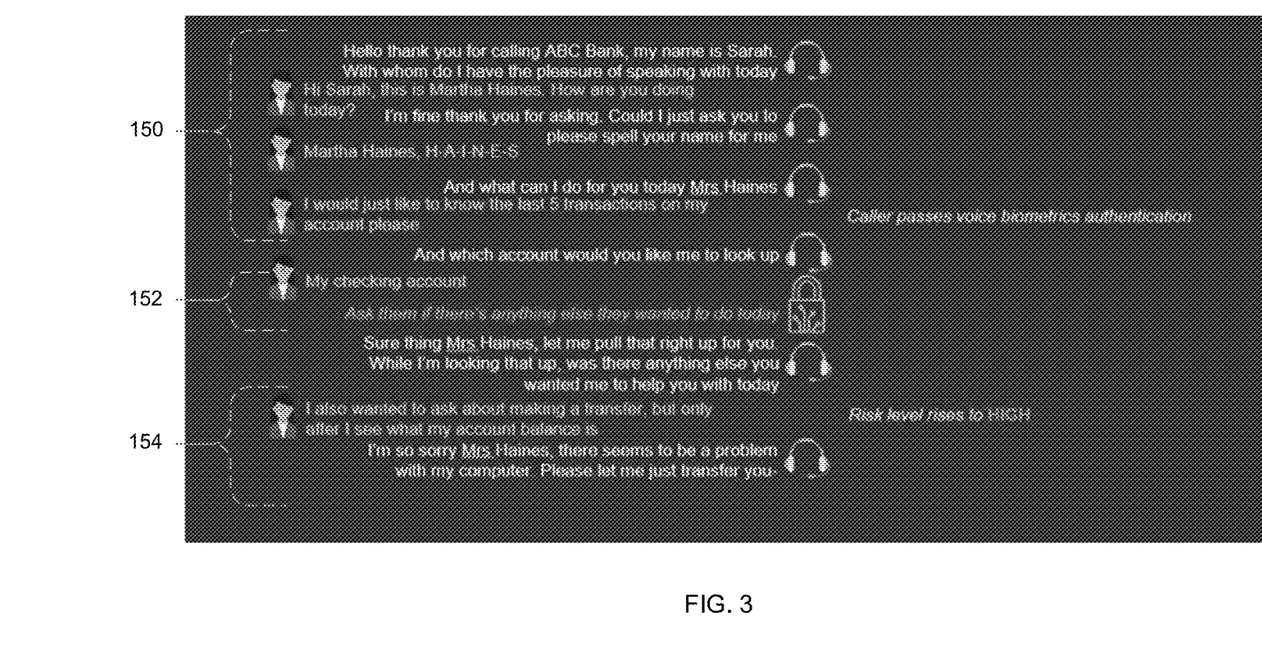
FIG. 3 is a diagrammatic view of a conversation transcript.

Referring also to FIG. 3, there is shown an example of such a conversation transcript between the caller (e.g., user 36) and the recipient (e.g., user 42). In this particular example, the conversation transcript is as follows:

User 36: Hello thank you for calling ABC Bank. My name is Sarah. With whom do I have the pressure of speaking with today?

User 42: Hi Sarah, this is Martha Haines. How are you doing today?

User 36: I'm fine thank you for asking. Could I ask you to please spell your name for me.

User 42: Martha Haines, H-A-I-N-E-S.

User 36: And what can I do for you today Mrs. Haines.

User 42: I would just like to know the last fine transactions on my account please.

(At this point in the conversation, fraud detection process 10 may determine that the caller (i.e., user 42) has passed voice biometrics authentication)

User 36: And which account would you like me to look up?

User 42: My checking account.

(At this point in time, fraud detection process 10 may ask the caller (i.e., user 42) if there is anything else they wanted to do today)

User 36: Sure thing Mrs. Haines, let me pull that right up for you. While I'm looking that up, was there anything else you wanted me to help you with today?

User 42: I also wanted to ask about making a transfer, but only after I see what my account balance is.

(At this point in time, fraud detection process 10 may raise the fraud threat to HIGH)

User 36: I'm so sorry Mrs. Haines, there seems to be a problem with my computer. Please let me transfer you.

Fraud detection process 10 may receive 100 input information (e.g., input information 58) concerning the conversation between the caller (e.g., user 36) and the recipient (e.g., user 42). Examples of input information 58 received 100 by fraud detection process 10 may include but are not limited to one or more of:

- a caller conversation portion, such as a word, phrase, comment or sentence spoken or typed by the caller (e.g., user 36);
- a recipient conversation portion, such as a word, phrase, comment or sentence spoken or typed by the recipient (e.g., user 42); and
- biometric information (e.g., biometric information 60), such as inflection patterns, accent patterns, pause patterns, word choice patterns, speech speed patterns, speech cadence patterns, speech rhythm patterns, word length patterns, voice print information, and stress level information concerning the caller (e.g., user 36).

Specifically and with respect to such biometric information (e.g., biometric information 60), fraud detection process 10 may analyze various speech pattern indicia defined within the conversation between the caller (e.g., user 36) and the recipient (e.g., user 42).

For example, fraud detection process 10 may process the conversation between the caller (e.g., user 36) and the recipient (e.g., user 42) to define one or more inflection patterns of the caller (e.g., user 36). As is known in the art, an inflection is an aspect of speech in which the speaker modifies the pronunciation of a word to express different grammatical categories (such as tense, case, voice, aspect, person, number, gender, and mood). Specifically, certain people may speak in certain manners wherein they may add specific inflections on e.g., the last words of a sentence. Such inflection patterns may be utilized by fraud detection process 10 to identify the provider of such content.

Additionally, fraud detection process 10 may process the conversation between the caller (e.g., user 36) and the recipient (e.g., user 42) to define one or more accent patterns of the caller (e.g., user 36). As is known in the art, different people of different ethnic origins may pronounce the same words differently (e.g., a native-born American speaking English, versus a person from the United Kingdom speaking English, versus a person from India speaking English). Further, people of common ethic origin may pronounce the same words differently depending upon the particular geographic region in which they are located (e.g., a native-born American from New York City versus a native-born American from Dallas, Texas). Such accent patterns may be utilized by fraud detection process 10 to identify the provider of such content.

Further, fraud detection process 10 may process the conversation between the caller (e.g., user 36) and the recipient (e.g., user 42) to define one or more pause patterns of the caller (e.g., user 36). As is known in the art, various people speak in various ways. Some people continuously speak without pausing, while other people may introduce a considerable number of pauses into their speech, while others may fill those pauses with filler words (e.g., "ummm", "you know", and "like"). Such pause patterns may be utilized by fraud detection process 10 to identify the provider of such content.

Additionally, fraud detection process 10 may process the conversation between the caller (e.g., user 36) and the recipient (e.g., user 42) to define one or more word choice patterns of the caller (e.g., user 36). Specifically, certain people tend to frequently use certain words. For example, one person may frequently use "typically" while another person may frequently use "usually". Such word choice patterns (e.g., word choice patterns 70) may be utilized by fraud detection process 10 to identify the provider of such content.

While four specific examples of speech-pattern indicia are described above (namely: inflection patterns, accent patterns, pause patterns, and word choice patterns), this is for illustrative purposes only and is not intended to be a limitation of this disclosure, as other configurations are possible and are considered to be within the scope of this disclosure. Accordingly, other examples of such speech-pattern indicia may include but are not limited to speech speed patterns, speech cadence patterns, speech rhythm patterns, word length patterns, voice print information, stress level information etc. For example, fraud detection process 10 may also utilize question/answer pairings to provide insight as to whether a caller is a fraudster.

Fraud detection process 10 may process 102 the input information (e.g., input information 58) to assess a fraud-threat-level (e.g., fraud-threat-level 62). For example and when processing 102 the input information (e.g., input information 58) to determine a fraud-threat-level (e.g., fraud-threat-level 62), fraud detection process 10 may determine 104 if the input information (e.g., input information 58) is indicative of fraudulent behavior.

For example, fraud detection process 10 may determine 104 if a word or phrase (e.g., input information 58) uttered or typed by the caller (e.g., user 36) is indicative of fraudulent behavior. Additionally/alternatively, fraud detection process 10 may determine 104 if biometric information 60 (e.g., inflection patterns, accent patterns, pause patterns, word choice patterns, speech speed patterns, speech cadence patterns, speech rhythm patterns, word length patterns, voice print information, stress level information) associated with the caller (e.g., user 36) is indicative of fraudulent behavior.

When determining 104 if the input information (e.g., input information 58) is indicative of fraudulent behavior, fraud detection process 10 may compare 106 the input information (e.g., input information 58) to a plurality of fraudulent behaviors (e.g., plurality of fraudulent behaviors 64).

Figure 4:
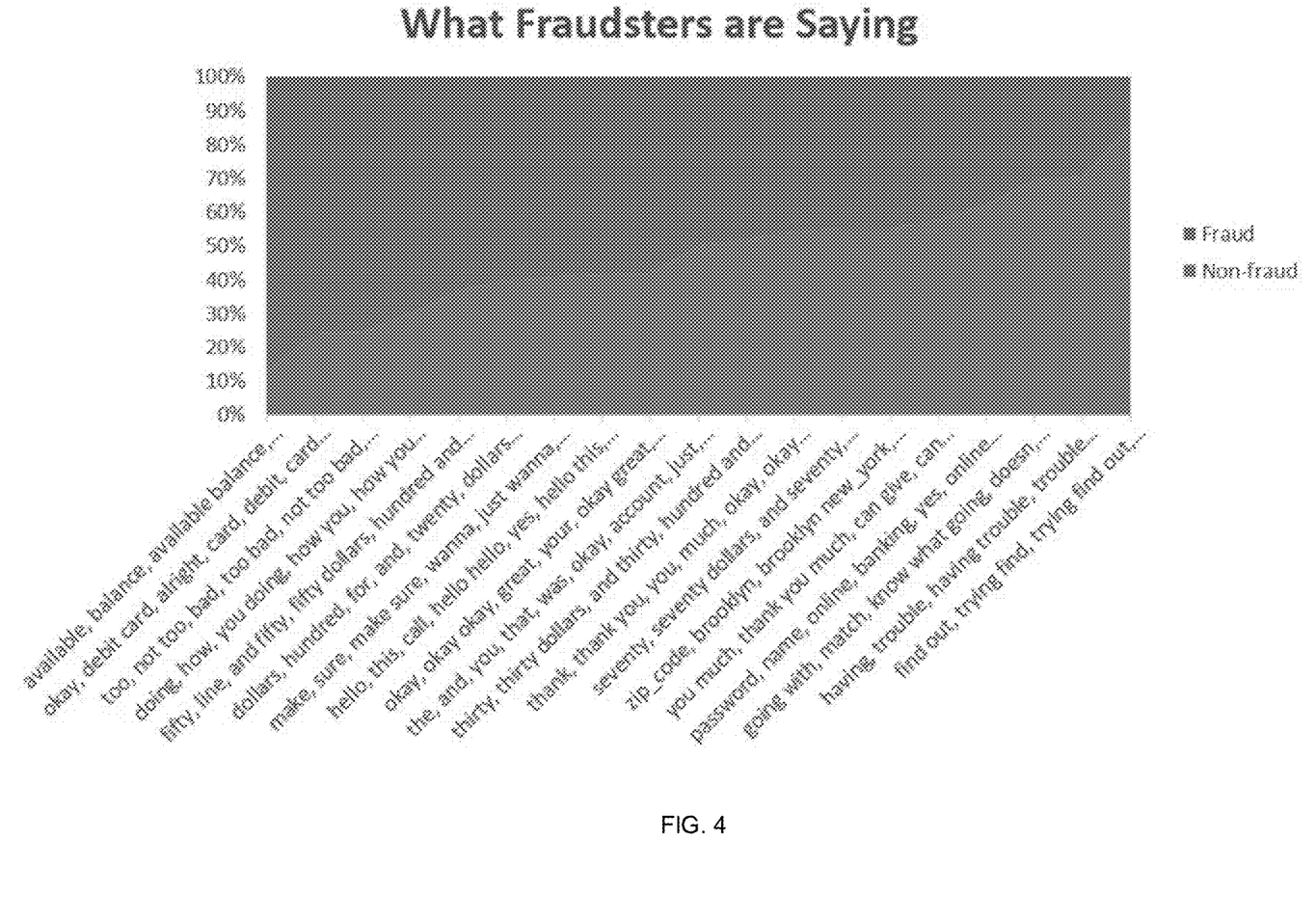
FIG. 4 is a diagrammatic view of a plurality of fraudulent behaviors.

Referring also to FIG. 4, there is shown a visual example of such a plurality of fraudulent behaviors (e.g., plurality of fraudulent behaviors 64). As shown in this particular example, the items on the left side of the graph (e.g., inquiries about account balances) have a high probability of being fraudulent behavior (90% fraudulent versus 10% legitimate), while the items on the right side of the graph (e.g., requests for help) have a low probability of being fraudulent behavior (10% fraudulent versus 90% legitimate).

The plurality of fraudulent behaviors (e.g., plurality of fraudulent behaviors 64) may include a plurality of empirically-defined fraudulent behaviors, wherein this plurality of empirically-defined fraudulent behaviors may be defined via AI/ML processing of information concerning a plurality of earlier conversations.

For example, assume that fraud detection process 10 has access to a data set (e.g., data set 66) that quantifies interactions between customer service representatives and those callers (both legitimate and fraudulent) that reached out to those customer service representatives. For this example, assume that the interactions defined within this data set (e.g., data set 66) identify inquiries made by the callers and the results of the interaction. Accordingly and by processing such interactions defined within this data set (e.g., data set 66), this plurality of empirically-defined fraudulent behaviors may be defined (via AI/ML processing), resulting in the plurality of fraudulent behaviors 64 defined within FIG. 4.

Fraud detection process 10 may define 108 a targeted response based, at least in part, upon the fraud-threat-level (e.g., fraud-threat-level 60) assessed, wherein the targeted response is intended to refine the assessed fraud-threat-level (e.g., fraud-threat-level 60). Fraud detection process 10 may then effectuate 110 the targeted response.

When effectuating 110 the targeted response, fraud detection process 10 may:
  allow 112 the conversation to continue;
  ask 114 a question of the caller (e.g., user 36);
  prompt 116 the recipient (e.g., user 42) to ask a question of the caller (e.g., user 36);
  effectuate 118 a transfer from the recipient (e.g., user 42) to a third-party; and
  end 120 the conversation between the caller (e.g., user 36) and the recipient (e.g., user 42).

For example and if fraud detection process 10 processes 102 the input information (e.g., input information 58) and assesses a fraud-threat-level (e.g., fraud-threat-level 62) that is low, fraud detection process 10 may effectuate 110 a targeted response that allows 112 the conversation to continue. Accordingly and during portion 150 of the conversation transcript shown in FIG. 3, fraud detection process 10 may assess a fraud-threat-level (e.g., fraud-threat-level 62) of low and may allow 112 the conversation to continue.

Further and if fraud detection process 10 processes 102 the input information (e.g., input information 58) and assesses a fraud-threat-level (e.g., fraud-threat-level 62) that is intermediate, fraud detection process 10 may effectuate 110 a targeted response that asks 114 a question of the caller (e.g., user 36). Accordingly and during portion 152 of the conversation transcript shown in FIG. 3, fraud detection process 10 may assess a fraud-threat-level (e.g., fraud-threat-level 62) of intermediate and may ask 114 a question of the caller (e.g., user 36). In this particular example, the question asked ("Is there anything else that you would like to do today?") may be directly asked via a synthesized voice (if a voice-based exchange) or via text (if a text-based exchange).

Alternatively and if fraud detection process 10 processes 102 the input information (e.g., input information 58) and assesses a fraud-threat-level (e.g., fraud-threat-level 62) that is intermediate, fraud detection process 10 may effectuate 110 a targeted response that prompts 116 the recipient (e.g., user 42) to ask a question of the caller (e.g., user 36). Accordingly and during portion 152 of the conversation transcript shown in FIG. 3, fraud detection process 10 may assess a fraud-threat-level (e.g., fraud-threat-level 62) of intermediate and may prompt 116 a question of the caller (e.g., user 36). In this particular example, the question asked ("Is there anything else that you would like to do today?") may be indirectly asked via the recipient (e.g., user 42) after prompting by fraud detection process 10.

Further and if fraud detection process 10 processes 102 the input information (e.g., input information 58) and assesses a fraud-threat-level (e.g., fraud-threat-level 62) that is high, fraud detection process 10 may effectuate 110 a targeted response that effectuates 118 a transfer from the recipient (e.g., user 42) to a third-party. Accordingly and during portion 154 of the conversation transcript shown in FIG. 3, fraud detection process 10 may assess a fraud-threat-level (e.g., fraud-threat-level 62) of high and may effectuate 118 a transfer of the caller (e.g., user 36) from the recipient (e.g., user 42) to a third-party (such as a supervisor or a manager).

Alternatively and if fraud detection process 10 processes 102 the input information (e.g., input information 58) and assesses a fraud-threat-level (e.g., fraud-threat-level 62) that is high, fraud detection process 10 may effectuate 110 a targeted response that ends 120 the conversation between the caller (e.g., user 36) and the recipient (e.g., user 42). Accordingly and when detecting a fraud-threat-level (e.g., fraud-threat-level 62) of high, fraud detection process 10 may end 120 the conversation between the caller (e.g., user 36) and the recipient (e.g., user 42) by disconnecting the call.

While described above are five targeted responses that may be effectuated 100 by fraud detection process 10, this is for illustrative purposes only and is not intended to be a limitation of this disclosure, as other configurations are possible and are considered to be within the scope of this disclosure. For example and when effectuating 100 a targeted response, fraud detection process 10 may display a result/decision to the recipient (e.g., user 42); and/or may display a result/decision to a backend analyst (not shown).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving input information concerning a conversation between a caller and a recipient;
   processing the input information to assess a fraud-threat-level of a plurality of fraud-threat-levels, wherein processing the input information to determine a fraud-threat-level includes determining if the input information is indicative of fraudulent behavior by comparing biometric information of one of a word and a phrase of the input information to a plurality of fraudulent behaviors and a plurality of legitimate non-fraudulent behaviors, wherein the biometric information includes speech pattern indicia including one or more of inflection patterns, word choice patterns, speech cadence patterns, speech rhythm patterns, and word length patterns;
   defining a targeted response based, at least in part, upon the fraud-threat-level assessed, wherein the targeted response is intended to refine the assessed fraud-threat-level; and
   effectuating the targeted response.

2. The computer-implemented method of claim 1 wherein the input information further includes one or more of:
   a caller conversation portion transcribed into the text; and
   a recipient conversation portion transcribed into the text.

3. The computer-implemented method of claim 1 wherein each fraud-threat-level of the plurality of fraud-threat-levels is associated with a different targeted response from the recipient to be effectuated against the caller.

4. The computer-implemented method of claim 1 wherein effectuating the targeted response includes one or more of:
   allowing the conversation to continue;
   asking a question of the caller;
   prompting the recipient to ask a question of the caller;
   effecting a transfer from the recipient to a third-party; and
   ending the conversation between the caller and the recipient.

5. The computer-implemented method of claim 1 wherein the conversation includes a voice-based conversation between the caller.

6. The computer-implemented method of claim 1 wherein the conversation includes a text-based conversation between the caller and the recipient.

7. The computer-implemented method of claim 1 wherein the plurality of fraudulent behaviors includes a plurality of empirically-defined fraudulent behaviors.

8. The computer-implemented method of claim 7 wherein the plurality of empirically-defined fraudulent behaviors are defined via AI/ML, processing of information concerning a plurality of earlier conversations.

9. A computer program product residing on a computer readable medium having a plurality of instructions stored thereon which, when executed by a processor, cause the processor to perform operations comprising:
   receiving input information concerning a conversation between a caller and a recipient;
   processing the input information to assess a fraud-threat-level of a plurality of fraud-threat-levels, wherein processing the input information to determine a fraud-threat-level includes determining if the input information is indicative of fraudulent behavior by comparing biometric information of one of a word and a phrase of the input information to a plurality of fraudulent behaviors and a plurality of legitimate non-fraudulent behaviors, wherein the biometric information includes speech pattern indicia including one or more of inflection patterns, word choice patterns, speech cadence patterns, speech rhythm patterns, and word length patterns;
   defining a targeted response based, at least in part, upon the fraud-threat-level assessed, wherein the targeted response is intended to refine the assessed fraud-threat-level; and
   effectuating the targeted response.

10. The computer program product of claim 9 wherein the input information further includes one or more of:
    a caller conversation portion transcribed into the text; and
    a recipient conversation portion transcribed into the text.

11. The computer program product of claim 9 wherein each fraud-threat-level of the plurality of fraud-threat-levels is associated with a different targeted response from the recipient to be effectuated against the caller.

12. The computer program product of claim 9 wherein effectuating the targeted response includes one or more of:
    allowing the conversation to continue;
    asking a question of the caller;
    prompting the recipient to ask a question of the caller;
    effecting a transfer from the recipient to a third-party; and
    ending the conversation between the caller and the recipient.

13. The computer program product of claim 9 wherein the conversation includes a voice-based conversation between the caller.

14. The computer program product of claim 9 wherein the conversation includes a text-based conversation between the caller and the recipient.

15. The computer program product of claim 9 wherein the plurality of fraudulent behaviors includes a plurality of empirically-defined fraudulent behaviors.

16. The computer program product of claim 15 wherein the plurality of empirically-defined fraudulent behaviors are defined via AI/ML, processing of information concerning a plurality of earlier conversations.

17. A computing system including a processor and memory configured to perform operations comprising:
- receiving input information concerning a conversation between a caller and a recipient;
- processing the input information to assess a fraud-threat-level of a plurality of fraud-threat-levels, wherein processing the input information to determine a fraud-threat-level includes determining if the input information is indicative of fraudulent behavior by comparing biometric information of one of a word and a phrase of the input information to a plurality of fraudulent behaviors and a plurality of legitimate non-fraudulent behaviors, wherein the biometric information includes speech pattern indicia including one or more of inflection patterns, word choice patterns, speech cadence patterns, speech rhythm patterns, and word length patterns;
- defining a targeted response based, at least in part, upon the fraud-threat-level assessed, wherein the targeted response is intended to refine the assessed fraud-threat-level; and
- effectuating the targeted response.

18. The computing system of claim 17 wherein the input information further includes one or more of:
- a caller conversation portion transcribed into the text; and
- a recipient conversation portion transcribed into the text.

19. The computing system of claim 17 wherein each fraud-threat-level of the plurality of fraud-threat-levels is associated with a different targeted response from the recipient to be effectuated against the caller.

20. The computing system of claim 17 wherein effectuating the targeted response includes one or more of:
- allowing the conversation to continue;
- asking a question of the caller;
- prompting the recipient to ask a question of the caller;
- effecting a transfer from the recipient to a third-party; and
- ending the conversation between the caller and the recipient.

21. The computing system of claim 17 wherein the conversation includes a voice-based conversation between the caller.

22. The computing system of claim 17 wherein the conversation includes a text-based conversation between the caller and the recipient.

23. The computing system of claim 17 wherein the plurality of fraudulent behaviors includes a plurality of empirically-defined fraudulent behaviors.

24. The computing system of claim 23 wherein the plurality of empirically-defined fraudulent behaviors are defined via AI/ML processing of information concerning a plurality of earlier conversations.

* * * * *